(12) United States Patent
Van Diepen et al.

(10) Patent No.: US 6,350,822 B1
(45) Date of Patent: Feb. 26, 2002

(54) MODIFIED POLYESTERS

(75) Inventors: Gary Joseph Van Diepen, Cranbourne; Michael Shane O'Shea, Mulgrave; Graeme Moad, Kallista, all of (AU)

(73) Assignee: Polymers Australia Pty Limited, Victoria (AU)

( * ) Notice: Subject to any disclaimer, the term of this patent is extended or adjusted under 35 U.S.C. 154(b) by 0 days.

(21) Appl. No.: 09/355,540

(22) PCT Filed: Jan. 30, 1998

(86) PCT No.: PCT/AU98/00051

§ 371 Date: Oct. 19, 1999

§ 102(e) Date: Oct. 19, 1999

(87) PCT Pub. No.: WO98/33837

PCT Pub. Date: Aug. 6, 1998

(30) Foreign Application Priority Data

Jan. 31, 1997 (AU) ............................................ PO 4887
May 6, 1997 (AU) ............................................ PO 6627

(51) Int. Cl.$^7$ ............................ C08L 67/00; C08L 69/00
(52) U.S. Cl. ...................... 525/444; 525/437; 525/439; 525/450; 525/466
(58) Field of Search ................................ 525/437, 444, 525/450, 466, 439

(56) References Cited

U.S. PATENT DOCUMENTS 5,436,056 A    7/1995    Takiyama et al. ........... 428/141
5,508,316 A *  4/1996    Nakamura ................... 521/182

FOREIGN PATENT DOCUMENTS

CH         678184 A5      8/1991
WO         WO 94/12564    6/1994

OTHER PUBLICATIONS

Derwent WPI Abstract of JP 61–124–684 A, WPI Acc. No: 1986–192847/198630, published Jun. 12, 1986.

* cited by examiner

Primary Examiner—Patricia A. Short
(74) Attorney, Agent, or Firm—Seed Intellectual Property Law Group PLLC

(57) ABSTRACT

A polymer blend comprising a polyester, a polyfunctional acid anhydride wherein said polyfunctional acid anhydride has a functionality as described herein of three or more, and a polyhydric alcohol or precursor thereto wherein said polyhydric alcohol has a functionality of three or more, and wherein said molar ratio of said polyfunctional acid anhydride to the polyhydric alcohol or precursor thereto is in the range of 0.5:1 to (10×C):1, where C is the number of moles of alcohol or equivalent in the polyhydric alcohol or precursor thereto.

40 Claims, No Drawings

MODIFIED POLYESTERS

The present invention relates to polyesters, in particular the present invention relates to modified polyesters having improved melt rheology (as can be measured by a number of means eg melt strength, melt viscosity, swell ratio, extensibility etc) and/or improved physical properties (eg reduced gas permeability, increased heat resistance, higher impact strength etc). The present invention further relates to a method of modifying a polyester to provide improved melt rheology and/or physical properties.

Thermoplastic polyesters resins such as polyethylene terephthalate (PET) and polybutylene terephthalate (PBT) have good mechanical characteristics, heat resistance, chemical resistance and dimensional stability (although there is scope for improvements in these and many other properties). These polyesters are widely used in the fields of extrusion, injection moulding and stretch blow moulding to produce products such as fibres containers and film.

While polyesters may be used in fields such as film blowing, tentering, thermoforming and foam extrusion, their use in these fields is often limited due to difficulties resulting from a narrow processing window and the need for specialized processing equipment. This is generally a result of deficiencies in the melt rheology of polyesters for these and other applications. Polyesters typically have low melt viscosity, low melt strength and low melt elasticity. While in some cases the deficiencies in the melt rheology a polyester resin may be partially overcome by the use of relatively expensive and sophisticated processing equipment, generally these deficiencies restrict such uses of polyester resins.

The use of various polyfunctional coupling agents including pyromellitic dianhydride (PDMA) to introduce branching into polyesters in order to improve melt viscosity or melt strength is discussed in, for example, Leslie et al. U.S. Pat. No. 4,145,466 and Ghatta et al. U.S. Pat. No. 5,362,763 and U.S. Pat. No. 5,422,381. Such reagents are incorporated during polyester synthesis by a solid state polycondensation process or require such a process following melt mixing to give a product of sufficient intrinsic viscosity. Dijkstra U.S. Pat. No. 3,553,157, Hayashi U.S. Pat. No. 5,134,028 and Rotter and Melquist U.S. Pat. No. 5,288,764 disclose the use of PDMA either alone or as a masterbatch in PET to improve the properties of PET in a melt processing method.

Muschiatti U.S. Pat. No. 5,229,432 describes the use of various branching agents including diacids, dianhydrides, and polyhydroxy compounds in an extruder to provide high melt strength PET for foaming applications. Similarly, Smith and Trevitt CH 688184 A5 disclose that a polycarboxylic acid anhydride (including PMDA) together with a polyhydric alcohol may be combined with PET in a melt mixing process to improve melt viscosity. These publications are however silent about the need of careful control over the ratio of components required to achieve the substantial improvements in rheological properties which we have found.

In addition to the melt rheology limitations of polyesters, they also generally have poor melt stability. Melt stability may be described as resistance toward polymer degradation during processing in the molten state (as evidenced by decreased molecular weight or decreased intrinsic viscosity and/or an increase in the amount of degradation products). Hydrolysis is one route via which polyesters degrade to produce lower molecular weight (lower intrinsic viscosity) materials. Hydrolysis is also evidenced by a reduction in polymer physical properties such as tear and tensile strengths, impact strength as well as flex life.

The lack of melt stability of polyesters is also evidenced in the inability to efficiently recycle PET scrap, in particular for food contact applications. For example, when PET is used to make carbonated beverage containers (by injection moulding into preforms and then subsequent stretch-blow moulding) a significant decrease in the molecular weight and corresponding decrease in the intrinsic viscosity of the PET occurs. This results in a decrease in the melt viscosity and melt strength of the PET relative to the virgin resin, making the processed material unsuitable for reprocessing into carbonated beverage bottles. One approach being employed to make use of recycled PET scrap is to incorporate it as an intermediate layer between virgin PET during the production of the bottle preforms by injection moulding. This approach requires very sophisticated injection moulding equipment and the method is not entirely satisfactory as the sandwiched preforms are more difficult to stretch-blow mould into bottles than the preform made of virgin PET only.

Other processes aimed at increasing the molecular weight of recycled PET, such as solid-stating, are costly and often render the use of recycled PET economically unattractive.

We have now found that the melt phase reaction of a polyester resin with a polyhydric alcohol and a polyfunctional acid anhydride in combination may be controlled to produce significant improvements in the melt rheology (eg melt viscosity, melt strength), intrinsic viscosity and molecular weight (Mw, Mz) of the polyester.

According to a first aspect, there is provided a polymer blend comprising a polyester, a polyfunctional acid anhydride wherein said polyfunctional acid anhydride has a functionality as described herein of three or more, and a polyhydric alcohol or precursor thereto wherein said polyhydric alcohol has a functionality of three or more, and wherein said molar ratio of said polyfunctional acid anhydride to the polyhydric alcohol or precursor thereto is in the range of 0.5:1 to $(10 \times C):1$, where C is the number of moles of alcohol or equivalent in the polyhydric alcohol or precursor thereto.

According to a second aspect of the present invention, there is provided a method for modifying a polyester comprising reacting said polyester with a polyfunctional acid anhydride and a polyhydric alcohol or precursor thereto wherein said polyfunctional acid anhydride has a functionality as described herein of three or more and wherein said polyhydric alcohol has a functionality of three or more and wherein the molar ratio of said polyfunctional acid or anhydride to the polyhydric alcohol or precursor thereto is present in the range of 0.5:1 to $(10 \times C):1$, where C is the number of moles of alcohol or equivalent in the polyhydric alcohol or precursor thereto.

According to a third aspect of the present invention, there is provided a method for coupling polyesters to at least one reactive polymer comprising reacting said polyester and said at least one reactive polymer with a polyfunctional acid anhydride and a polyhydric alcohol or precursor thereto wherein said polyfunctional acid anhydride has a functionality as described herein of three or more and wherein said polyhydric alcohol or precursor thereto has a functionality of three or more and wherein the molar ratio of said polyfunctional acid anhydride to the polyhydric alcohol or derivative thereof is present in the range of 0.5:1 to $(10 \times C):1$, where C is the number of moles of alcohol or equivalent in the polyhydric alcohol or precursor thereto.

According to a fourth aspect of the present invention there is provided a branched or chain extended polyester or a polyester blend formed by the melt phase reaction of a polyester resin with a polyhydric alcohol or precursor thereto and a polyfunctional acid anhydride in combination wherein said polyfunctional acid anhydride has a functionality as described herein of three or more and wherein said polyhydric alcohol has a functionality of three or more and wherein the molar ratio of said polyfunctional acid or anhydride to the polyhydric alcohol or precursor thereto is present in the range of 0.5:1 to (10×C):1, where C is the number of moles of alcohol or equivalent in the polyhydric alcohol or precursor thereto.

The present invention also provides polymers and polymer blends produced by the processes described herein.

Polyesters suitable for use in the present invention are preferably thermoplastic polyesters and include all heterochain macromolecular compounds that possess repeat carboxylate ester groups in the backbone of the polymer. Also suitable for use as polyesters in the present invention are polymers which contain esters on side chains or grafts. Also suitable for use in the present invention are copolymers which incorporate monomers having carboxylate ester groups (in the backbone or as side groups or grafts) and derivatives of polyesters which retain the carboxylate ester groups (in the backbone or side groups or grafts). The polyesters suitable for use in the present invention may also contain acids, anhydrides and alcohols in the backbone or as side chains (eg acrylic and methacrylic containing polymers). Such polymers may also function as one or both of the additives to modify the polyesters.

Preferred polyesters for use in the present invention include polyethylene terephthalate (PET), polybutylene terephthalate (PBT), polyethylene naphthalate (PEN), copolymers of PET, copolymers of PBT, copolymers of PEN, liquid crystalline polyesters (LCP) and polyesters of carbonic acid (polycarbonates) and blends of one or more thereof.

Copolymers of PET include variants containing other comonomers. For example, the ethane diol may be replaced with other diols such as cyclohexane dimethanol to form a PET copolymer. Copolymers of PBT include variants containing other comonomers. Copolymers of PEN include variants containing other comonomers. Copolymers of PEN/PET are also useful in the present invention. These copolymers may be blended with other polyesters. Other blends of polyesters may be provided in accordance with the present invention. The use of the process in accordance with the present invention has the effect of increasing the coupling of between blended polyesters. The modification in accordance with the present invention may be to one or both (all) polyesters present in the blend and may be conducted in situ with the effect of modifying all the polyesters present in the blend.

Liquid crystalline polyesters include polyhydroxybenzoic acid (HBA), poly-2-hydroxy-6-naphthoic acid and polynaphthalene terephthalate (PNT) which is a copolymer of 2,6-dihydroxynaphthalene and terephthalic acid. Copolymers of liquid crystal polyesters with other polyesters are also suitable in the present invention.

Side chain or graft ester, acid or alcohol containing polymers include: poly(methyl methacrylate) (or other methacrylates or acrylates); polymethacrylic acid; polyacrylic acid; polyhydroxyethyl methacrylate, starch, cellulose etc.

Copolymers or graft copolymers containing acid, ester or alcohol containing polymers include ethylene co-vinyl acetate, ethylene co-vinyl alcohol, ethylene co-acrylic acid, maleic anhydride grafted polyethylene, etc.

Polyhydric alcohols suitable for use in the present invention have a functionality of three or more and will be understood to have at least three hydroxy groups per molecule. For example, glycerol has a functionality of three and pentaerythritol has a functionality of four. Examples of suitable polyhydric alcohols and precursors thereto include glycerol, trimethylolpropane, trimethylolethane, pentaerythritol or ester thereof, 1,2,6-hexanetriol, sorbitol, glycerol tripropylate and polyether glycols of hydroxy functionality greater than three, glycerol tribenzoate, 1,1,4,4-tetrakis (hydroxymethyl)cyclohexane, tris(2-hydroxyethyl) isocyanurate, and dipentaerythritol, tripentaerythritol etc. Triols derived by condensing alkylene oxides having 2–6 carbons, eg. ethylene oxide, propylene oxide with polyhydric initiators, which have 3–6 carbons, eg. glycerol, diglycerol etc., may also be used. It is also possible to use alcohol (or derivatives thereof) containing polymers or copolymers as the polyhydric alcohol eg poly(ethylene-co-vinyl alcohol), poly(ethylene-co-vinyl acetate). Hydroxy functional silanes of siloxane may also be used as a suitable polyhydric alcohol or derivative thereof. One or more polyhydroxy alcohols may be used in combination.

Preferred polyhydric alcohols or derivatives thereof include pentaerythritol or ester derivatives thereof, dipentaerythritol, tripentaerythritol, trimethylolpropane, trimethylolethane and glycerol.

The polyhydric alcohol may be provided by a compound which is converted in situ to the polyhydric alcohol. Such compounds are generally referred to herein as precursors to the polyhydric alcohol. Suitable precursors to the polyhydric alcohols include ester derivatives of said polyhydric alcohols.

Polyfunctional acid anhydrides suitable for use in the present invention have a functionality of three or more and will be understood to have at least three acid groups or acid group residues per molecule. The polyfunctional acid anhydrides will be understood to have functionality whereby trimellitic anhydride has a functionality of three and pyromellitic dianhydride has a functionality of four.

Examples of polyfunctional acid anhydrides include aromatic acid anhydrides, cyclic aliphatic anhydrides, halogenated acid anhydrides, pyromellitic dianhydride, benzophenonetetracarboxylic acid dianhydride, cyclopentanetetracarboxylic dianhydride, diphenyl sulfone tetracarboxylic dianhydride, 5-(2,5-dioxotetrahydro-3furanyl)-3-methyl-3-cyclohexene-1,2-dicarboxylic dianhydride, bis(3,4-dicarboxyphenyl)ether dianhydride, bis (3,4-dicarboxyphenyl)thioether dianhydride, bisphenol-A bisether dianhydride, 2,2-bis(3,4-dicarboxyphenyl) hexafluoropropane dianhydride, 2,3,6,7-napthalenetetracarboxylic acid dianhydride, bis(3,4-dicarboxyphenyl)sulfone dianhydride, 1,2,5,6-napthalenetetracarboxylic acid dianhydride, 2,2',3,3'-biphenyltetracarboxylic acid, hydroquinone bisether dianhydride, 3,4,9,10-perylene tetracarboxylic acid dianhydride, 1,2,3,4-cyclobutanetetracarboxylic acid dianhydride, 3,4-dicarboxy-1,2,3,4-tetrahydro-1-naphthalene-succinic acid dianhydride, bicyclo(2,2)oct-7-ene-2,3,5,6-tetracarboxylic acid dianhydride, tetrahydrofuran-2,3,4,5-tetracarboxylic acid dianhydride, 2,2-bis(3,4-dicarboxyphenyl)propane dianhydride, 3,3',4,4'-biphenyltetracarboxylic acid dianhydride, 4,4'-oxydiphthalic dianhydride (ODPA), and ethylenediamine tetraacetic acid dianhydride (EDTAh). It is also possible to use acid anhydride containing polymers or copolymers as the acid anhydride component. One or more polyfunctional acid anhydrides may be used in combination.

Preferred polyfunctional acid anhydrides, include pyromellitic dianhydride, 1,2,3,4-cyclopentanetetracarboxylic acid dianhydride, 1,2,3,4-cyclobutanetetracarboxylic acid dianhydride and tetrahydrofuran-2,3,4,5-tetracarboxylic acid dianhydride. Most preferably the polyfunctional acid anhydride is pyromellitic dianhydride.

The molar ratio of the polyfunctional acid anhydride to the polyhydric alcohol or precursor thereto is in the range of 0.5:1 to (10×C):1, where C is the number of moles of hydroxy groups in the polyhydric alcohol. In the case of precursors of polyhydric alcohols, this is the same as the number of moles of hydroxy groups and equivalents thereof per mole of precursor.

It is particularly preferred that the molar ratio of polyfunctional acid anhydride to polyhydric alcohol or precursor thereto is in the range of from 2:1 to (2×C):1.

In order to clearly demonstrate the calculation of the molar ratio the following example is provided:

Example Calculation: For the modification of polyethyleneterephthalate (PET) using pyromellitic dianhydride (PMDA) and pentaerythritol (pent'ol).

PMDA=tetra functional acid anhydride

Pentaerythritol=tetra functional alcohol

The polyhydric alcohol, pentaerythritol, used in this example has a functionality of 4, therefore C=4.

The mole ratio of PMDA to pentaerythritol is in the range of from 0.5:1 to 40 (10×4):1, with the preferred mole ratio of PMDA to pentaerythritol being in the range of from 2:1 to 8 (2×4):1.

By way of example, employing 0.1 mole % of pentaerythritol (based upon the total amount of ester in the polyester) and using a mole ratio of PMDA to pentaerythritol of 4:1 corresponds to a PMDA loading of 0.4 mole %.

In order to modify 100 kg of PET (520.83 moles of ethyleneterephthalate repeat unit—192 g/mole), the 0.1 mole % of pentaerythritol corresponds to 0.520 moles which is equal to 70.83 grams. The 0.4 mole % of PMDA corresponds to 2.083 moles which is equal to 454.15 grams. The 0.1 mole % pentaerythritol corresponds to 0.07 wt % of the total mixture (additives plus PET). Correspondingly 0.4 mole % PMDA corresponds to 0.45 wt % of the total mixture.

Preferably the amount of the polyhydric alcohol or derivative thereof as a mole % of the total amount of ester in the polyester is in the range from 0.005 to 4 mole %, preferably in the range of from 0.01 to 1 mole % and more preferably in the range of from 0.01 to 0.015 mole %. The mole % of the polyfunctional acid anhydride may be calculated from the functionality of the polyhydric alcohol using the molar ratio formula above. The limits would be 0.005 to 40×C, with the preferred limits being 0.1 to 2×C.

Example Calculation: PET modification using pentaerythritol (C=4) and PMDA and a 4:1 molar ratio of PMDA to pentaerythritol.

| Pentaerythritol (C = 4) | Range 0.005 to 4 mole % | (0.003 to 2.8 wt %) |
|---|---|---|
| | Preferred 0.01 to 1 mole % | (0.007 to 0.7 wt %) |
| | More preferred 0.01 to 0.015 mole % | (0.007 to 0.11 wt %) |

Condensation catalysts may be added to the reaction mixture in order to enhance the reaction rate of the polyfunctional acid anhydride and the polyhydric alcohol or precursor thereto with the polyester. Condensation catalysts may also be used to improve the extent of reaction and hence enhance the improved melt strength properties.

Typical condensation catalysts include Lewis acids such as antimony trioxide, titanium oxide and dibutyltindilaurate. Other condensation catalysts may also be used in the present invention.

The polyesters and blends of the present invention may be advantageously blended with unmodified polyester resins where the unmodified polyester resin may be the same or different to that are used to make the modified polyester. The modified polyester may be used as a masterbatch to be precompounded and subsequently blended or processed in melt mixing or other processing equipment to impart improved properties to the blend.

Other additives which may be incorporated into the polymer blend of the present invention include monofunctional additives to act as blockers so as to control the degree of chain extension and/or branching as was described by Edelman et al. in U.S. Pat. No. 4,1611,579 for the production of controlled branched polyesters by a combination of condensation/solid state polycondensation. Examples of suitable monofunctional additives include acids (eg benzoic acid) or anhydrides or esters thereof (eg benzoic acid anhydride, acetic anhydride). Monofunctional alcohols may also be used.

Additives (eg. carbonates) may be incorporated to enhance foaming of the polymer blend where foamed products are required. Gases may also be injected into the polymer blend of the present invention in order to achieve physical rather than chemical foaming.

Other additives which may be added include pigments, fillers, antioxidants, UV-stabilisers, colour improvers etc (or any additive not included in the original polyester preparation).

The reactive polymer suitable for use in the third aspect of the present invention may include other polyesters or other polymers containing functional groups capable of reacting with the polyfunctional acid anhydride or the polyhydric alcohol or precursor thereto or the polyester.

In the process of the present invention the polyester may be reacted with the polyhydric alcohol or precursor thereto and the polyfunctional acid anhydride conveniently by melt mixing. Melt mixing may conveniently be achieved by continuous extrusion equipment such as twin screw extruders, single screw extruders, other multiple screw extruders and Farell mixers. Semi-continuous or batch polymer processing equipment may also be used to achieve melt mixing. Suitable equipment includes injection moulders, Banbury mixers and batch mixers. Static mixing equipment may include pipes containing fixed obstacles arranged in such a way as to favour the subdivision and recombination of the flow to thoroughly mix the polyhydric alcohol and precursor thereto and the polyfunctional acid anhydrides with the polyester.

Advantageously, we have found that the reaction of a polyhydric alcohol or a precursor thereto in combination with a polyfunctional acid anhydride and a polyester or polyester blend in a melt mixing apparatus provides a product with substantially improved melt rheology and which has an intrinsic viscosity which is as high or higher than that of the polyester or polyester blend. The effect of using the polyhydric alcohol or precursor thereto and a polyfunctional acid anhydride in combination is much greater than that of using either reagent alone. The effect may be further enhanced by the addition of a polycondensation catalyst. This means that a product can be formed using very low levels of added reagents as compared to processes previously described by Smith and Trevitt. Moreover, we have found that the product thus formed has substantially less colour than product formed with PDMA alone.

While not wishing to be bound by theory, it is believed that the polyhydric alcohol reacts with the polyester by alcoholisis to produce a branched polyester and also ensures that the polyester has a substantial fraction of hydroxy end groups. The polyfunctional acid anhydride acts both as a coupling agent and as a dehydrating agent to ensure there is no molecular weight reduction during processing and to give increase in molecular weight and intrinsic viscosity depending on the mole ratio of polyhydric alcohol to anhydride employed. The polyfunctional acid anhydride may also act as a branching agent. The polyhydric alcohol and the polyfunctional acid anhydride should be chosen so as to give the desired degree of branching and also for solubility or compatibility with the polyester to be modified.

It is also believed that the reaction may continue after melt mixing, even in the solid state by polycondensation. The polyhydric alcohol or precursor thereto and the polyfunctional acid anhydride may be added to the polyester for reaction be that simultaneously or sequentially and either before, during or after the polyester has melted or during a second melting process after initial modification. These sequenced additions may be used to control the structure as well as the performance of the resultant polymer. For example, the addition of the polyhydric alcohol or precursor thereto with the polyfunctional acid anhydride may result in a reaction competing with the reaction with the polyester, which may form a preliminary star-like molecule. Alternatively reacting the polyhydric alcohol or derivative thereof with the polyester may result initially in chain scission/hydrolysis. In a subsequent reaction with the polyfunctional acid anhydride a coupling of the reaction products may result.

We have found it particularly convenient to produce a masterbatch by mixing polyester powder with the polyfunctional acid anhydride and the polyhydric alcohol or precursor thereto in a hopper and gravimetrically feed the mixture into a twin screw extruder with the polyester to be modified. Melt mixing occurs in the extruder. A vacuum is preferably applied to the extruder for the removal of unreacted components or byproducts that may be formed (such as water). The extruded product then exits the extruder, is cooled (eg passed through a water bath) and then pelletised. Optionally the reaction may be continued by solid state polycondensation.

Solid state polycondensations are generally performed on materials which have already had a single pass through an extruder of some type in order to produce a material with an increased molecular weight. Heating certain polymers (eg polyesters) below their melting point serves to dry the polymer and extend the polymerisation of the polymer resulting in increase molecular weight and intrinsic viscosity of the material. This may be done by either: (a) heating a polymer at high temperatures for a long period of time (15–40 hrs) or by (b) using ionising radiation once the polymeric material has been produced.

The process of the present invention may be used to limit or control the nett degradation (eg. hydrolysis) suffered by polyesters during thermal processing (eg. extrusion) alone or in blends with other polymers or additives (eg fillers).

The polymer blends of the present invention may be advantageously selected for use in blown film applications where higher melt viscosity, viscoelasticity and strength in the melt allow higher blow up ratios, greater biaxial orientation and faster through-puts while maintaining bubble stability.

The improved melt rheology of the polymer blends of the present invention advantageously allows the reduction in processing steps and improvement in material properties. The improvements in melt rheology allow the polyesters of the present invention to be processed without prior drying, facilitate the blow moulding of polyesters, in particular the improvements in the melt rheology facilitate stretch blow moulding, facilitate the foaming of polyesters, enhance adhesion of the polyester to polar fillers such as used in glass reinforced polyesters, permit polyesters to be thermoformed with greater ease and permit polyesters to be coupled to give copolymers with improved properties including barrier and oxygen transmission.

Recycled polyesters may advantageously be reacted with the polyhydric alcohol or precursors thereto and the polyfunctional acid anhydride. Advantageously, the present invention allows upgrading of recycled polyesters to be equivalent or superior to virgin polyesters in melt viscosity (eg modification of recycled PET to improve its processing and performance as an inner layer in stretch-blown bottles). Such recycled polyesters are suitable for use in packaging materials amongst others.

The polymer blends of the present invention show improvements in melt rheology while minimizing colour development during processing and allowing lower levels of extractables for food contact applications.

The modified polyesters of the present invention provide, in addition to improvements in melt strength and melt rheology, improved crystallisation characteristics. The modified polyesters provide increased peak crystallisation temperatures and an increased rate and degree of crystallisation. The increases in the peak crystallisation temperature, degree and rate of crystallisation have been shown to be effective, even at low levels of addition of polyfunctional acid anhydride and polyhydric alcohol or precursor thereto. Advantageously the improvements in the crystallisation characteristics are observed when a low level of a modifeid masterbatch is used in conjunction with a blend of unmodifeid polyester. The improvment in the crystallisation characteristics are advantageous even when the melt strength or melt rehology is not significantly improved.

While nuecleators, such as polyolefins, have been blended with polyesters to improve the crystallisation performance of the polyester, their use generally results in premature discoloration and degradation of the polyester. The discoloration and degradation results in an inability to reprocess thermoformer lace or trim. The modified polyester of the present invention alleviates the need for the use of a nucleating polyolefin and thereby permits thermoformer lace or trim to be readily reprocessed.

Generally only random polyester copolymers can be produced or formed by reactor condensation/polycondensation process. For some applications it is more desirable to use tapered or block polyesters. The conventional process for making such materials is by transesterification. Transesterification can be a difficult process to control and too much transesterification leads to a more random copolyester which may not be useful (eg some PET/PEN blends if over-transesterified cannot be stretch-blow molded). The coupling process of the third aspect of the present invention provides an alternative means to form block polyester copolymers. Coupling and branching may also provide a means to produce non-linear block polyesters for a wide range of applications (eg melt strength improvers). Block copolymers formed by coupling/branching may either be produced in-situ in a blend for example by injection molding. For block copolymers it is envisaged that properties other than improved melt rheology may be required, therefore it may not be desirable to significantly increase the molecular weight of the copolymer or its degree of branching.

Branched or chain extended polymers or copolymers for use as feedstocks or additives for production of articles with improved properties (eg. gas permeability, heat resistance, impact strength) or improved processability (eg. high melt viscosity polymer for stretch blow molding, extrusion blow molding, sheet forming, foaming, thermoforming, extrusion, injection molding or any other thermal process of the polymers) may be formed by the process of the present invention.

Advantageously, the present invention may be used to improve the processability and/or the product performance of polyesters or polyester containing copolymers or blends in both traditional and non-traditional applications by production of chain extended polyesters or copolymer-polyesters (eg mixture of different polyesters or a polyester and an ester or alcohol containing polymers) by coupling (and transesterifcation).

The branched/chain extended copolymer product produced by the process of the third aspect of the present invention may or may not have improved melt rheology. However, the product will have advantageous properties by virtue of its structure compared to copolymers of similar compositions produced by other means.

Throughout this specification and the claims which follow, unless the context requires otherwise, the word "comprise", or variations such as "comprises" or "comprising", will be understood to imply the inclusion of a stated integer or group of integers but not the exclusion of any other integer or group of integers.

The present invention is further described with reference to the following non-limiting examples.

EXAMPLES

General Procedure (1) Modification in a Twin Screw Extruder (TSE)

Two different twin screw extruders were used in the examples, namely (i) a JSW TEX 30 and (ii) a W+P ZSK 30. Descriptions of each extruder and the operating conditions employed are outlined below.

JSW TEX 30

The JSW TEX 30 is a twin screw extruder having a 30 mm screw diameter and an overall L/D of 42 [comprising ten temperature controlled barrel sections of L/D 3.5, three unheated sampling monitoring blocks of L/D 1.167 and a cooled feed block of L/D 3.5]. The extruder was operated in either co-rotating (intermeshing self wiping) or counter rotating (intermeshing non-self wiping) modes with throughputs between 5 and 30 kg/kr and screw speeds of between 100 and 400 rpm. The barrel section temperatures were set between 250 and 320° C. A typical barrel set temperature profile is as follows (zone 1 to the die): 250° C.; 280° C. by 9. The melt temperatures and pressures were monitored at three points along the barrel and in the die.

W+P ZSK 30

The W+P ZSK 30 is a co-rotating intermeshing self wiping twin screw extruder having a 30 mm screw diameter and an overall L/D of 40 [comprising six heated barrel zones]. The extruder was operated with throughputs between 5 or 10 kg/kr at screw speeds of between 100 and 200 rpm. The barrel section temperatures were set between 260 and 280° C. A typical barrel set temperature profile is as follows (zone 1 to the die): 260° C.; 280° C. by 5. The melt temperature and pressure was monitored in the die section of the extruder.

For both the twin screw extruders the modified polyester exiting the die of the extruder was cooled in a water bath, pelletised and then crystallised and dried in a oven or dessicant drier (Dew point −70° C.) under nitrogen prior to any further analysis.

(2) Modification in a Single Screw Extruder (SSE)

The single screw extruder used in the examples was a Brabender single screw extruder of L/D=25 (4 heated barrel sections) and screw diameter of 19 mm.

(Also allow for blending in the Brabender)

(4) Modifier Incorporation

For both the twin screw (JSW TEX 30 and the W+P ZSK30) and the single screw (Brabender) extruders the modifiers (polyfunctional acid anhydride, polyhydric alcohol and condensation catalyst) were either (i) as a modified masterbatch—where the modifiers were mixed with polymer to be modified in the form of a powder and then fed to the main feed throat of the extruder along with the main feed of the polymer pellets or powder, (ii) added neat to the main feed throat along with the main feed of the polymer pellets or powder to be modified or (iii) pre-mixed with all the polymer to be modified (mostly as powdered polymer) and then fed to the main feed throat of the extruder.

Typically the modified masterbatch contained from 2% w/w to 60% w/w modifiers the remainder being polyesters (typically as a powder).

Procedure Evaluation

The effect of processing and composition upon sample properties were monitored by:

(i) Intrinsic viscosity (IV) measured by use of a Davenport melt viscometer or equivalent solution IV using a capilliary viscometer;

(ii) Melt strengths were measured on a "Rheotens" Melt Strength Tester, Type 010.1, supplied by Gottfert Werkstoff-Prufmaschinen GmbH of Buchen, Germany. This test involves drawing an extruded strand of polymer vertically into the nip between two counter-rotating nip rollers. The strand was extended using a Brabender Plasticord single screw extruder of screw diameter 19 mm and length to diameter ratio (L/D) of 25. The extrudate exited via a right angle capillary die (2 mm diameter). The temperature profile used was uniform along the length of the barrel of the extruder and the die and was set at 270° C. Melt flow indexes (MFI) were measured at 230° C. with a 2.16 kg load. The nip rollers are mounted on a balance arm which allows the force in the drawing strand to be measured. The velocity of the nip rolls is increased at a uniform acceleration rate. As the test proceeds, the force increases until eventually the strand breaks. The force at breakage is termed the "melt strength".

While there is no internationally-established standard set of test requirements for melt strength testing, comparative melt strength values obtained under the given set of test conditions provide a quantitative determination of the increase in melt strength used in the patent. The test conditions used were: die temperature 270° C., extruder output rate~4 g/min, acceleration rate 1.2 cm/sec², draw distance 210 mm, matt finish steel rollers.

(iii) GPC molecular analysis monitored by dissolving the sample in a 2 wt % hexafluoroisopropanol (HFIP)/98 wt % chloroform mixture and eluting the sample through two Polymer Labs GPC columns (effective molecular weight 100–2,000,000). Universal calibration was used to give PET equivalent molecular weights;

(iv) DSC analysis using either a Perkin Elmer DSC-7 or TA Instruments Modulated DSC operated at a scan rate of 20° C. per min;

(v) Melt flow index (MFI) testing at 280° C. using a 2.16 kg load (samples were predried at 160° C. for 4 hours) according to ASTM 1238.

(vi) The drop times were determined by measuring the time taken for the polyester strand (cut at the die face) to drop from the die of the extruder (either JSW TEX30, W+P ZSK30 or Brabender SSE) to the floor. The drop time test combines the effects of melt viscosity, extensional viscosity, chain entanglement (as shown by die swell), and elasticity (as shown by the tendency to resist neck formation).

TABLE 1

Polyester and other polymer feedstocks used in the examples

| No. | Trade Name | Manufacturer | Comments |
| --- | --- | --- | --- |
| 1 | Skypet AC | Skico, Korea | PET Copolymer of 0.75 Intrinsic viscosity (TV) |
| 2 | Shinpet 5015w | Shinkong, Tiawan | PET Copolymer of 0.75 Intrinsic Viscosity |
| 3 | Eastapak 9663 | Eastman Chemical Ltd | PET homopolymer of 0.80 IV |
| 4 | Cleartuf 8406 | Shell Chemical Company | PET copolymer of 0.84 IV |
| 5 | Hypertuf 86017 | Shell Chemical Company | Copolymer of PET and polyethylene napthalate (PEN) of composition 92 mole % PEN and 8 mole % PET |
| 6 | Repete | ACI | Post consumer recycled PET; nominal IV = 0.70 |
| 7 | Phoenix PCR PET | Phoenix Pty Ltd, USA | Post consumer recycled PET, nominal IV = 0.70 |
| 8 | St Jude PCR PET | St Jude Pty Ltd, USA | Post consumer recycled PET, containing green copper phthalocyanine green pigment, nominal IV = 0.70 |
| 9 | Eastapak 9506 | Eastman Chemical Ltd | PET homopolymer of 0.95 IV |

Comparative Examples CE-1 to CE-10- Effect of PMDA Additive Alone—without Catalyst

| Sample Number | PMDA wt % | Pent'ol wt % | Catalyst wt % | Mole Ratio PMDA/pent'ol | IV[c] (dL/g) |
| --- | --- | --- | --- | --- | --- |
| CE-1 | 0.000[a] | 0.000 | 0.000 | — | 0.75 |
| CE-2 | 0.000[b] | 0.000 | 0.000 | — | 0.59 |
| CE-3 | 0.050 | 0.000 | 0.000 | — | 0.62 |
| CE-4 | 0.100 | 0.000 | 0.000 | — | 0.70 |
| CE-5 | 0.200 | 0.000 | 0.000 | — | 0.70 |
| CE-6 | 0.300 | 0.000 | 0.000 | — | 0.70 |
| CE-7 | 0.500 | 0.000 | 0.000 | — | 0.83 |
| CE-8 | 1.000 | 0.000 | 0.000 | — | 0.77 |
| CE-9 | 1.500 | 0.000 | 0.000 | — | 0.66 |
| CE-10 | 3.000 | 0.000 | 0.000 | — | <0.50 |

[a]Sample not extruded - control virgin Skypet AC
[b]Virgin material extruded
[c]IV calculated from Davenport method Comparative Examples CE-11 to CE-15-Effect of Pentaerythritol Additive Alone—without Catalyst

| Sample Number | PMDA wt % | Pent'ol wt % | Catalyst wt % | Mole Ratio PMDA/pent'ol | IV[c] (dL/g) |
| --- | --- | --- | --- | --- | --- |
| CE-11 | 0.000[a] | 0.000 | 0.000 | — | 0.75 |
| CE-12 | 0.000[b] | 0.000 | 0.000 | — | 0.59 |
| CE-13 | 0.000 | 0.100 | 0.000 | — | 0.64 |
| CE-14 | 0.000 | 0.200 | 0.000 | — | 0.66 |
| CE-15 | 0.000 | 0.300 | 0.000 | — | 0.57 |

[a]Sample not extruded - control virgin Skypet AC
[b]Virgin material extruded
[c]IV calculated from Davenport method Examples 1 to 9-Effect of Different Mole Ratios of Additives (PMDA to Pent'ol) —without catalyst

| Sample Number | PMDA wt % | Pent'ol wt % | Catalyst wt % | Mole Ratio PMDA/pent'ol | IV[c] (dL/g) |
| --- | --- | --- | --- | --- | --- |
| CE-16 | 0.000[a] | 0.000 | 0.000 | — | 0.75 |
| CE-17 | 0.000[b] | 0.000 | 0.000 | — | 0.59 |
| 1 | 0.300 | 0.374 | 0.000 | 0.5:1.0 | 0.65 |
| 2 | 0.300 | 0.188 | 0.000 | 1.0:1.0 | 0.68 |
| 3 | 0.300 | 0.094 | 0.000 | 2.0:1.0 | 0.71 |
| 4 | 0.300 | 0.062 | 0.000 | 3.0:1.0 | 0.75 |
| 5 | 0.300 | 0.047 | 0.000 | 4.0:1.0 | 0.76 |
| 6 | 0.300 | 0.037 | 0.000 | 5.0:1.0 | 0.80 |
| 7 | 0.300 | 0.031 | 0.000 | 6.0:1.0 | 0.78 |
| 8 | 0.300 | 0.023 | 0.000 | 8.0:1.0 | 0.76 |
| 9 | 0.300 | 0.019 | 0.000 | 10.0:1.0 | 0.73 |

[a]Sample not extruded - control virgin Skypet AC
[b]Virgin material extruded
[c]IV calculated from Davenport method Examples 10 to 17-Effect of Different Mole Ratios of Additives (PMDA to Pent'ol) —with Catalyst

| Sample Number | PMDA wt % | Pent'ol wt % | Catalyst wt % | Mole Ratio PMDA/pent'ol | IV[c] (dL/g) |
| --- | --- | --- | --- | --- | --- |
| CE-18 | 0.000[a] | 0.000 | 0.000 | — | 0.75 |
| CE-19 | 0.000[b] | 0.000 | 0.000 | — | 0.59 |
| 10 | 0.300 | 0.186 | 0.015 | 1.0:1.0 | 0.62 |
| 11 | 0.300 | 0.093 | 0.015 | 2.0:1.0 | 0.69 |
| 12 | 0.300 | 0.062 | 0.015 | 3.0:1.0 | 0.74 |
| 13 | 0.300 | 0.047 | 0.015 | 4.0:1.0 | 0.77 |
| 14 | 0.300 | 0.037 | 0.015 | 5.0:1.0 | 0.86 |
| 15 | 0.300 | 0.031 | 0.015 | 6.0:1.0 | 0.91 |
| 16 | 0.300 | 0.023 | 0.015 | 8.0:1.0 | 0.85 |
| 17 | 0.300 | 0.019 | 0.015 | 10.0:1.0 | 0.84 |

[a]Sample not extruded - control virgin Skypet AC
[b]Virgin material extruded
[c]IV calculated from Davenport method Examples 18 to 27-Effect of Different Levels of Additives

| Sample Number | PMDA wt % | Pent'ol wt % | Catalyst wt % | Mole Ratio PMDA/pent'ol | Melt Strength Tensile (cN) | Melt Strength Velocity (cm/sec) | IV[c] (dL/g) | IV[d] (dL/g) |
|---|---|---|---|---|---|---|---|---|
| CE-20 | 0.000[a] | 0.000 | 0.000 | — | 0.7 | 47 | 0.75 | — |
| CE-21 | 0.000[b] | 0.000 | 0.000 | — | 0.5 | 34 | 0.59 | — |
| 18 | 0.300 | 0.186 | 0.015 | 1.0:1.0 | 0.4 | 45 | 0.62 | — |
| 19 | 0.300 | 0.093 | 0.015 | 2.0:1.0 | 0.5 | 47 | 0.69 | — |
| 20 | 0.300 | 0.062 | 0.015 | 3.0:1.0 | 0.5 | 45 | 0.74 | — |
| 21 | 0.326 | 0.057 | 0.015 | 3.6:1.0 | 8.0 | 106 | 0.93 | 1.02 |
| 22 | 0.354 | 0.058 | 0.015 | 3.8:1.0 | 10.0 | 115 | 0.88 | 0.98 |
| 23 | 0.670 | 0.110 | 0.029 | 3.8:1.0 | 59 | 18 | 0.98 | — |
| 24 | 0.300 | 0.037 | 0.015 | 5.0:1.0 | 9.5 | 118 | 0.86 | — |
| 25 | 0.600 | 0.062 | 0.030 | 6.0:1.0 | 26.7 | 10 | 0.91 | — |
| 26 | 0.351 | 0.031 | 0.015 | 7.1:1.0 | 7.0 | 112 | 0.91 | 0.94 |
| 27 | 0.300 | 0.023 | 0.015 | 8.0:1.0 | 1.2 | 60 | 0.85 | — |

[a]Sample not extruded - control virgin Skypet AC
[b]Virgin material extruded
[c]IV calculated from Davenport method
[d]IV calculated from solution method in phenol/tetrachloroethane Examples 28 and 29-Effect of Different Mole Ratios of Additives on a Different Grade of PET (Shinpet)

| Sample Number | PMDA wt % | Pent'ol wt % | Catalyst wt % | Mole Ratio PMDA/Pent'ol | Melt Strength Tensile (cN) | Melt Strength Velocity (cm/sec) | IV[c] (dL/g) |
|---|---|---|---|---|---|---|---|
| CE-22 | 0.000[a] | 0.000 | 0.000 | — | 0.6 | 40 | 0.73 |
| CE-23 | 0.000[b] | 0.000 | 0.000 | — | <1 | 50 | 0.69 |
| CE-24 | 0.990 | 0.000 | 0.000 | — | 4 | 49 | 0.84 |
| 28 | 0.857 | 0.134 | 0.000 | 4.0:1.0 | 70 | 10 | 1.00 |
| 29 | 0.912 | 0.078 | 0.000 | 7.3:1.0 | 43 | 17 | 0.94 |

[a]Sample not extruded - control virgin Shinpet 5015 w
[b]Virgin material extruded
[c]IV calculated from Davenport method Examples 30 to 32-Effect of Different Mole Ratios of Additives on a Recycled Grade of PET (ACI)

| Sample Number | PMDA wt % | Pent'ol wt % | Catalyst wt % | Mole Ratio PMDA/Pent'ol | IV[c] (dL/g) |
|---|---|---|---|---|---|
| CE-25 | 0.000[a] | 0.000 | 0.000 | — | <0.7 |
| CE-26 | 0.000[b] | 0.000 | 0.000 | — | 0.54 |
| 30 | 0.326 | 0.057 | 0.015 | 3.6:1.0 | 1.01 |
| 31 | 0.354 | 0.029 | 0.029 | 7.6:1.0 | 0.91 |
| 32 | 0.297 | 0.086 | 0.030 | 2.2:1.0 | 0.89 |

[a]Sample not extruded - Post consumer recycled PET (ACI Repete, nominal IV 0.7)
[b]Sample extruded with no additives
[c]IV calculated from Davenport method Examples 33 to 37-Effect of processing conditions on the modification of blends of PET (Cleartuf 8406) and PEN-co-PET (Hypertuf 86017).-Modification in a TSE α

| Sample Number | Comp. Cleartuf 8406 (hypertuf 86017) % w/w | T'put (kg/hr) | PMDA % w/w | Pent'ol % w/w | Catalyst % w/w | Extruder Motor Current (amps) | MFI @ 280° C. 2.16 kg (g/10 min) |
|---|---|---|---|---|---|---|---|
| CE-27 | 100 (0) | 5 | 0 | 0 | 0 | 9 | 18.0 |
| CE-28 | 0 (100) | 5.2 | 0 | 0 | 0 | 10 | 5.6 |
| CE-29 | 75.9 (24.1) | 5 | 0 | 0 | 0 | 9 | ? |
| 33 | 100 (0) | 5.2 | 0.354 | 0.029 | 0.015 | 19 | ? |
| 34 | 3.8 (96.2) | 5.2 | 0.354 | 0.029 | 0.015 | 17 | 1.3 |
| 35 | 76.1 (23.9) | 10.2 | 0.181 | 0.015 | 0.008 | 14 | 6.8 |
| 36 | 76.5 (23.5) | 5.2 | 0.354 | 0.029 | 0.015 | 21 | 2.7 |
| 37 | 76.5 (23.5) | 10.4 | 0.354 | 0.029 | 0.015 | 17 | 4.5 |

[a]JSW TEX 30
[b]Modifiers were blended with PET powder (Cleartuf 8406) and added as a masterbatch at 0.2 kg/hr Examples 38 to 42 Modification of PET copolymer (Shinpet 5015w)-Effect of additive mole ratio (PMDA and Pent'ol)-Modification in TSE α

| Sample Number | PMDA % w/w | Pent'ol % w/w | Catalyst % w/w | Mole ratio PMDA:pent'ol | MFI @280° C. g/10 min |
|---|---|---|---|---|---|
| CE-30 | 0 | 0 | 0 | — | 33.9 |
| 38 | 0.3 | 0.062 | 0.015 | 3.0:1 | 8.6 |
| 39 | 0.3 | 0.046 | 0.015 | 4.0:1 | 8.6 |
| 40 | 0.3 | 0.037 | 0.015 | 5.0:1 | 12.1 |
| 41 | 0.3 | 0.031 | 0.015 | 6.0:1 | — |
| 42 | 0.3 | 0.027 | 0.015 | 7.0:1 | 9.3 |

[a]JSW TEX 30

Examples 43 to 47-Modification of PET Copolymer (Shinpet 5015w) in SSE-Effect of additive level

| Sample Number | PMDA % w/w | Pent'ol % w/w | Catalyst % w/w | Mole ratio PMDA:pent'ol | Drop Time (secs)[a] | Motor Torque (MG) |
|---|---|---|---|---|---|---|
| CE-31 | 0 | 0 | 0 | — | 4.4 | 50 |
| 43 | 0.15 | 0.0187 | 0.0075 | 5:1 | 8.4 | 200 |
| 44 | 0.3 | 0.037 | 0.015 | 5:1 | 15.5 | 450 |
| 45 | 0.45 | 0.056 | 0.0225 | 5:1 | 16.0 | 400 |
| 46 | 0.6 | 0.075 | 0.030 | 5:1 | 17.0 | 600 |
| 47 | 3.0 | 0.37 | 0.15 | 5:1 | 21.3 | — |

Extruder set barrel temperature profile: 270, 280; 320; 280° C.
Screw speed = 20 rpm
[a] The measured melt temperature was in the range 302 to 303° C.

Examples 48 to 51-Modification of PET homopolymer (Eastman 9663) in a SSE-Effect of additive level

| Sample Number | PMDA % w/w | Pent'ol % w/w | Catalyst % w/w | Mole ratio PMDA:pent'ol | Drop Time (secs)[a] | Motor torque (MG) | MFI @ 280° C. g/10 min |
|---|---|---|---|---|---|---|---|
| CE-32 | 0 | 0 | 0 | — | 5.9 | — | 24.7 |
| 48 | 0.1 | 0.012 | 0.005 | 5:1 | 10.5 | 350 | 17.8 |
| 49 | 0.2 | 0.025 | 0.010 | 5:1 | 22.2 | 350 | 12.1 |
| 50 | 0.3 | 0.037 | 0.015 | 5:1 | 43.8 | 735 | 5.4 |
| 51 | 0.6 | 0.075 | 0.030 | 5:1 | 113.9 | 1000 | — |

Extruder set barreltemperature profile: 250, 260; 300; 270° C.
Screw speed = 20 rpm
[a]The measured melt temperature was in the range 294 to 296° C.

Examples 51 to 55-Effect of blending premodified PET homopolymer (Eastman 9663) with virgin PET homopolymer-Modification in a SSE

| Sample Number | Blend comp. mod. PET (virgin PET) % w/w | PMDA % w/w in blend | Pent'ol % w/w in blend | Catalyst % w/w in blend | Mole ratio PMDA: pent'ol | Drop time (secs)[a] |
|---|---|---|---|---|---|---|
| CE-32 | 0 (100) | 0 | 0 | 0 | — | 5.9 |
| 50 | 100 (0) | 0.3 | 0.037 | 0.015 | 5:1 | 43.8 |
| 51 | 100 (0) | 0.6 | 0.075 | 0.030 | 5:1 | 113.9 |
| 52 | 10% wt Ex 50 90% wt virgin | 0.03 | 0.0037 | 0.0015 | 5:1 | 6.5 |
| 53 | 20% wt of Ex 50 80% wt virgin | 0.06 | 0.0074 | 0.003 | 5:1 | 6.6 |
| 54 | 5% wt of EX 51 95% wt virgin | 0.03 | 0.0037 | 0.0015 | 5:1 | 11.1 |
| 55 | 10% wt of Ex 51 90% wt virgin | 0.06 | 0.0074 | 0.003 | 5:1 | 14.6 |

Extruder set barrel temperature profile: 250, 260; 300; 270° C.
Screw speed = 20 rpm
[a]The measured melt temperature was in the range 294 to 296° C.

Example 56-Effect of addition of trimellitic anhydride (TMA), pentaerythritol and catalyst to PET copolymer (Shinpet 5015w)-Modification in a SSE

| Sample number | TMA % w/w | Pent'ol % w/w | Catalyst % w/w | Mole ratio TMA: pent'ol | MFI @280° C. g/10 min |
|---|---|---|---|---|---|
| CE-33 | 0 | 0 | 0 | — | 54.0 |
| 56 | 0.259 | 0.047 | 0.015 | 4:1 | 40.3 |

Extruder set barrel temperature profile 250; 260; 300; 270° C.
Screw speed = 20 rpm

Example 57 to 59-Effect of addition of cyclopentane 1,2,3,4, tetracarboxyliedianhydride (CPTDA), pentaerythritol and catalyst to PET copolymer (Shinpet 5015w)-Modification in a SSE

| Sample number | CPTDA % w/w [a] | Pent'ol % w/w | Catalyst % w/w | Mole ratio CPTDA: pent'ol [b] | MFI @280° C. g/10 min |
|---|---|---|---|---|---|
| CE-34 | 0 | 0 | 0 | — | 54.0 |
| 57 | 0.73 | 0.188 | 0.030 | 2:1 | 51.4 |
| 58 | 0.36 | 0.047 | 0.015 | 4:1 | 36.6 |
| 59 | 0.36 | 0.031 | 0.015 | 6:1 | 30.4 | a % w/w of technical grade of CPTDA used - nominal purity 80%
b Based on the assumption that CPTDA used was 80% pure

Example 60-Effect of addition of 4,4'-oxydiphthalic dianhydride (ODPA), pentaerythritol and catalyst to PET copolymer (Shinpet 5015w)-Modification in a SSE

| Sample number | ODPA % w/w | Pent'ol % w/w | Catalyst % w/w | Mole ratio ODPA: pent'ol | MFI @280° C. g/10 min |
|---|---|---|---|---|---|
| CE-34 | 0 | 0 | 0 | — | 54.0 |
| 60 | 0.84 | 0.094 | 0.032 | 4:1 | 48.0 |

Examples 61 to 65-Effect of addition of PMDA, Trimethylolethane-(TME) and catalyst to PET copolymer (Shinpet 5015w)-Modification in a SSE

| Sample Number | PMDA % w/w | THME % w/w | Catalyst % w/w | Mole ratio PMDA: THME | Drop Time (secs) | Motor torque (MG) | MFI @ 280° C. g/10 min |
|---|---|---|---|---|---|---|---|
| CE-34 | 0 | 0 | 0 | — | 6.6 | 15 | 54.0 |
| CE-35 | 0.3 | 0 | 0 | — | 19.9 | 120 | 16.2 |
| CE-36 | 0.3 | 0 | 0.015 | — | 24.9 | 292 | 7.2 |
| 61 | 0.6 | 0.092 | 0.030 | 3.6:1 | 175.0 | 380 | |
| 62 | 0.3 | 0.083 | 0.015 | 2:1 | 17.0 | 74 | 12.7 |
| 63 | 0.3 | 0.041 | 0.015 | 4:1 | 64.5 | 265 | 3.1 |
| 64 | 0.3 | 0.028 | 0.015 | 6:1 | 54.1 | 200 | 6.1 |
| 65 | 0.3 | 0.021 | 0.015 | 8:1 | 77.0 | 220 | 6.8 |

THME – functionality = 3

Example 66 to 70-Effect of addition of PMDA, Glycerol and catalyst to PET copolymer (Shinpet 5015w)-Modification in a SSE

| Sample Number | PMDA % w/w | Glycerol % w/w | Catalyst % w/w | Mole ratios PMDA: Glycerol | Drop Time (secs) | Motor torque (MG) | MFI @ 280° C. g/10 min |
|---|---|---|---|---|---|---|---|
| CE-34 | 0 | 0 | 0 | — | 6.6 | 15 | 54.0 |
| CE-35 | 0.3 | 0 | 0 | — | 19.9 | 120 | 16.2 |
| CE-36 | 0.3 | 0 | 0.015 | — | 24.9 | 292 | 7.2 |
| 66 | 0.6 | 0.063 | 0.03 | 4:1 | 365 | 600 | 0.9 |
| 67 | 0.3 | 0.063 | 0.015 | 2:1 | 41.9 | 800 | 7.3 |
| 68 | 0.3 | 0.032 | 0.015 | 4:1 | 54.7 | 300 | 6.3 |
| 69 | 0.3 | 0.021 | 0.015 | 6:1 | 49.0 | 350 | 5.4 |
| 70 | 0.3 | 0.016 | 0.015 | 8:1 | 29.1 | 140 | 5.6 |

Examples 71 to 77-Effect of addition of PMDA, Dipentaerythritol (DPE) and catalyst to PET copolymer (Shinpet 5015w)-Modification in a SSE

| Sample Number | PMDA w/w | DPE % w/w | Catalyst % w/w | Mole ratio PMDA: DPE | Drop Time (secs) | Motor torque (MG) | MFI @ 280° C. g/10 min |
|---|---|---|---|---|---|---|---|
| CE-34 | 0 | 0 | 0 | — | 6.6 | 15 | 54.0 |
| CE-35 | 0.3 | 0 | 0 | — | 19.9 | 120 | 16.2 |
| CE-36 | 0.3 | 0 | 0.015 | — | 24.9 | 292 | 7.2 |
| 71 | 0.3 | 0.35 | 0.015 | 1:1 | 105.8 | 253 | 5.2 |
| 72 | 0.1 | 0.058 | 0.005 | 2:1 | 18.6 | 200 | 17.7 |
| 73 | 0.2 | 0.116 | 0.010 | 2:1 | 44.8 | 310 | 10.4 |
| 74 | 0.3 | 0.175 | 0.015 | 2:1 | 362.0 | 900 | 3.5 |
| 75 | 0.3 | 0.087 | 0.015 | 4:1 | 181.0 | 245 | 4.8 |
| 76 | 0.3 | 0.044 | 0.015 | 8:1 | 68.1 | 480 | 4.7 |
| 77 | 0.3 | 0.029 | 0.015 | 12:1 | 48.9 | 1485 | 2.8 |

Examples 78 and 79-Effect of modification of recycled PET (Phoenix-PCR PET)-Different levels of modifiers.-Modification in a TSE α

| Sample Number | PMDA % w/w | pent'ol % w/w | Catalyst % w/w | Mole ratio PMDA pent'ol | Die Swell Ratio | MFI @ 280° C. g/10 min |
|---|---|---|---|---|---|---|
| CE-37 | 0 | 0 | 0 | — | — | 58 |
| CE-38 | 0 | 0 | 0 | — | 0.6 | 72 |
| 78 | 0.740 | 0.115 | 0.011 | 4:1 | 3.8 | 8.0 |
| 79 | 1.398 | 0.217 | 0.021 | 4:1 | 5.3 | 0.8 |

(Note:
Phoenix processed at 5 kg/hr)
[a]W + P ZSK 30

Examples 80 to 82-Effect of modification of recycled PET (St Jude-PCR PET-pigmented "green")-Different levels of modifiers.-Modification in a TSE α

| Sample Number | PMDA % w/w | Pent'ol % w/w | Catalyst % w/w | Mole ratio PMDA pent'ol | Die Swell Ratio | MFI @ 280° C. g/10 min |
|---|---|---|---|---|---|---|
| CE-39 | 0 | 0 | 0 | — | — | 59 |
| CE-40 | 0 | 0 | 0 | — | 0.7 | 75 |
| 80 | 0.435 | 0.068 | 0.007 | 4:1 | 1.2 | 30 |
| 81 | 0.865 | 0.135 | 0.013 | 4:1 | 1.8 | 9.6 |
| 82 | 1.730 | 0.270 | 0.026 | 4:1 | 2.8 | 1.0 |

(Note:
St Jude processed at 10 kg/hr)
[a] W + P ZSK 30

Examples 78 to 82 and 40-Evaluation of the foamability of modified, recycled PET and virgin PET-Foaming in SSE using $CO_2$ A 30 mm dia. Killion segmented screw extruder with a L:D ratio of 40:1 equipped with a very small dia. (about 1 mm) rod die was used in this work. Pre-dried resin was feeder metered into the hopper and plasticized within 19 D length. Carbon dioxide was injected at this point at a constant pressure, (aided by an air driven gas booster), and mixed into the melt. Different process conditions, were used depending on the type of rheological characteristics of the resin. In each run, conditions were varied to produce the best foam structure. Die temperatures ranged from 235 to 267 C, die pressures from 1500 to 2500 psi, and gas pressures from 1000 to 2000 psi. Screw speed and feed rate were kept constant. Resins were analysed for melt flow index at 280 C/2.16 kg for density, cell size and uniformity.

| Sample Number | Total level of additives (% w/w) | Pressure at gas inj (MPa)[a] | Pressure at die (MPa) | Melt Temp. (° C.) | Foam density (Kg/m³) | Av. foam cell size (um) |
|---|---|---|---|---|---|---|
| Phoenix | 0 | 2.1 | 2.6 | 242 | [b] | [b] |
| 78 | 0.9 | 2.3 | 11.2 | 242 | 0.19 | 450 |
| 79 | 1.7 | 2.6 | 2.8 | 262 | 0.17 | 370 |
| St Jude | | | | | | |
| CE-40 | 0 | 2.1 | 2.6 | 239 | [b] | [b] |
| 80 | 0.5 | 0.9 | 1.2 | 247 | 0.43 | 490 |
| 81 | 1.0 | 6.1 | 14.2 | 248 | 0.11 | 430 |
| 82 | 2.0 | 3.2 | 4.0 | 266 | 0.11 | 350 |
| Shinpet | | | | | | |
| 40 | ~0.3 | 3.5 | 4.0 | 252 | 0.15 | 440 |

[a] Pressure at gas injection port = pressure at gas cylinder plus pressure from melt
[b] Would not foam Those skilled in the art will appreciate that the invention described herein is susceptible to variations and modifications other than those specifically described. It is to be understood that the invention includes all such variations and modifications which fall within its spirit and scope. The invention also includes all of the steps, features, compositions and compounds referred to or indicated in this specification, individually or collectively, and any and all combinations of any two or more of said steps or features.

What s claimed is:

1. A polymer blend comprising a polyester, a polyfunctional acid anhydride having at least three acid groups or acid group residues, and a polyhydric alcohol or precursor thereto, wherein said polyhydric alcohol has at least three hydroxy groups, and wherein said polyfunctional acid anhydride and said polyhydric alcohol or precursor thereto are present in a molar ratio in the range of 2:1 to (10×C):1, where C is the number of moles of hydroxy group per mole of polyhydric alcohol.

2. A polymer blend according to claim 1 wherein the polyester is selected from the group consisting of polyethylene terephthalate (PET), polybutylene terephthalate (PBT), polyethylene naphthalate (PEN), copolymers of PET, copolymers of PBT, copolymers of PEN, liquid crystalline polyesters (LCP) and polyesters of carbonic acid (polycarbonates) and blends of one or more thereof.

3. A polymer blend according to either claim 1 or claim 2 wherein the polyester is polyethylene terphthalate.

4. A polymer blend according to claim 1 wherein the polyfunctional acid anhydride is pyromellitic dianhydride.

5. A polymer blend according to claim 1 wherein the polyhydric alcohol is selected from the group consisting of pentaerythritol, dipentaerythritol, tripentaerythritol, trimethylolpropane, trimethylolethane and glycerol.

6. A polymer blend according to claim 1 wherein the molar ratio is in the range of from 2:1 to (2×C):1.

7. A polymer blend according to claim 1 wherein the polymer blend further comprises a polycondensation catalyst.

8. A polymer blend according to claim 7 wherein the polycondensation catalyst is antimony dioxide.

9. A polymer blend according to claim 1 wherein said polymer blend further comprises at least one additive elected from the group consisting of an unmodified polyester resin, a mono-functional additive, a foaming agent, pigment, filler, antioxidant, UV stabilizer and colour improver.

10. A method for modifying a polyester comprising reacting said polyester with a polyfunctional acid anhydride and a polyhydric alcohol or precursor thereto in the melt phase, wherein said polyfunctional acid anhydride has at least three acid groups or acid group residues and wherein said polyhydric alcohol has at least three hydroxy groups, and wherein said polyfunctional acid anhydride and said polyhydric alcohol or precursor thereto are present in a molar ratio in the range of 2:1 to (10×C):1, where C is the number of moles of hydroxy group per mole of polyhydric alcohol.

11. A method according to claim 10 wherein the polyester is selected from the group consisting of polyethylene terephthalate (PET), polybutylene terephthalate (PBT), polyethylene naphthalate (PEN), copolymers of PET, copolymers of PBT, copolymers of PEN, liquid crystalline polyesters (LCP) and polyesters of carbonic acid (copolycarbonates) and blends thereof.

12. A method according to either claim 10 or claim 11 wherein the polyester is polyethylene terphthalate.

13. A method according to claim 10 wherein the polyfunctional acid anhydride is pyromellitic dianhydride.

14. A method according to claim 10 wherein the polyhydric alcohol is selected from the group consisting of pentaerythritol, dipentaerythritol, tripentaerythritol, trimethylolpropane, trimethylolethane and glycerol.

15. A method according to claim 10 wherein the molar ratio is in the range of from 2:1 to (2×C):1.

16. A method according to claim 10 wherein a polycondensation catalyst is additionally reacted with the polyester.

17. A method according to claim 16 wherein said condensation catalyst is antimony trioxide.

18. A method according to claim 10 wherein said polymer blend further comprises at least one additive elected from the group consisting of an unmodified polyester resin, a mono-functional additive, a foaming agent, pigment, filler, antioxidant, UV stabilizer and colour improver.

19. A method according to claim 10 wherein the polyester is reacted with the polyfunctional acid anhydride and a polyhydric alcohol or precursor thereto by melt mixing.

20. A method according to claim 10 wherein the said polyester is in the form of a powder.

21. A method for coupling a polyester to at lest one reactive polymer comprising reacting said polyester and said at least one reactive polymer in the melt phase with a polyfunctional acid anhydride and a polyhydric alcohol or precursor thereto, wherein said polyfunctional acid anhydride has at least three acid groups or acid group residues and wherein said polyhydric alcohol has at least three hydroxy groups, and wherein said polyfunctional acid anhydride and said polyhydric alcohol or precursor thereof are present in a molar ratio in the range of 2:1 to (10×C):1, where C is the number of moles of hydroxy group per mole of polyhydric alcohol.

22. A method according to claim 21 wherein the polyester is selected from the group consisting of polyethylene terephthalate (PET), polybutylene terephthalate (PBT), polyethylene naphthalate (PEN), copolymers of PET, copolymers of PBT, copolymers of PEN, liquid crystalline polyesters (LCP) and polyesters of carbonic acid (polycarbonates) and blends thereof.

23. A method according to either claim 21 or claim 22 wherein the polyester and/or the at least one reactive polymer is polyethylene terphthalate.

24. A method according to claim 21 wherein the polyfunctional acid anhydride is pyromellitic dianhydride.

25. A method according to claim 21 wherein the polyhydric alcohol is selected from the group consisting of pentaerythritol, dipentaerythritol, tripentaerythritol, trimethylolpropane, trimethylolethane and glycerol.

26. A method according to claim 21 wherein the molar ratio is in the range of from 2:1 to (2×C):1.

27. A method according to claim 21 wherein the polycondensation catalyst is additionally reacted with the polyester blend.

28. A method according to claim 27 wherein the polycondensation catalyst is antimony trioxide.

29. A method according to claim 21 wherein the melt phase reaction is conducted in the presence of at least one additive selected from the group consisting of an unmodified polyester resin, a monofunctional additive, a foaming agent, pigment, filler, antioxidant, UV stabilizer and colour improver.

30. A method according to claim 21 wherein the polyester and the at least one reactive polymer are reacted with the polyfunctional acid anhydride and a polyhydric alcohol or precursor thereto by melt mixing.

31. A method according to claim 21 wherein the said polyester is in the form of a powder.

32. A branched or chain extended polyester or a polyester blend formed by the melt phase reaction of a polyester resin with a polyhydric alcohol or precursor thereto and a polyfunctional acid anhydride in combination, wherein said polyfunctional acid anhydride has at least three acid groups or acid group residues and wherein said polyhydric alcohol has at least three hydroxy groups, and wherein said polyfunctional acid or anhydride and said polyhydric alcohol or precursor thereto are present in a molar ratio in the range of 2:1 to (10×C):1, where C is the number of moles of hydroxy group per mole of polyhydric alcohol.

33. A branched or chain extended polyester or polyester blend according to claim 32 wherein the polyester is selected from the group consisting of polyethylene terephthalate (PET), polybutylene terephthalate (PBT), polyethylene naphthalate (PEN), copolymers of PET, copolymers of PBT, copolymers of PEN, liquid crystalline polyesters (LCP) and polyesters of carbonic acid (polycarbonates) and blends of one or more thereof.

34. A branched or chain extended polyester or polyester blend according to either claim 32 or claim 33 wherein the polyester is polyethylene terphthalate.

35. A branched or chain extended polyester or polyester blend according to claim 32 wherein the polyfunctional acid anhydride is pyromellitic dianhydride.

36. A branched or chain extended polyester of polyester blend according to claim 32 wherein the polyhydric alcohol is selected from the group consisting of pentaerythritol, dipentaerythritol, tripentaerythritol, trimethylolpropane, trimethylolethane and glycerol.

37. A branched or chain extended polyester or polyester blend according to claim 32 wherein the molar ratio is in the range of from 2:1 to (2×C):1.

38. A branched or chain extended polyester or polyester blend according to claim 32 wherein the polymer blend further comprises a polycondensation catalyst.

39. A branched or chain extended polyester or polyester blend according to claim 38 wherein the polycondensation catalyst is antimony dioxide.

40. A branched or chain extended polyester or polyester blend according to claim 32 wherein said polymer blend further comprises at least one additive elected from the group consisting of an unmodified polyester resin, a monofunctional additive, a foaming agent, pigment, filler, antioxidant, UV stabilizer and color improver.

* * * * *

UNITED STATES PATENT AND TRADEMARK OFFICE
CERTIFICATE OF CORRECTION

PATENT NO.    : 6,350,822 B1                                        Page 1 of 1
DATED         : February 26, 2002
INVENTOR(S)   : Gary Joseph Van Diepen et al.

It is certified that error appears in the above-identified patent and that said Letters Patent is hereby corrected as shown below:

<u>Column 23,</u>
Line 30, "A method for coupling a polyester to at lest" should read -- A method for coupling a polyester to at least --.

<u>Column 24,</u>
Line 41, "A branched or chain extended polyester of" should read -- A branched or chain extended polyester or --.

Signed and Sealed this

Twenty-seventh Day of August, 2002

Attest:

Attesting Officer

JAMES E. ROGAN
*Director of the United States Patent and Trademark Office*